(12) United States Patent
Sheth et al.

(10) Patent No.: US 7,747,461 B2
(45) Date of Patent: Jun. 29, 2010

(54) WIRELESS SUBSCRIBER LOYALTY SYSTEM AND METHOD

(75) Inventors: Shyam Sheth, Toronto (CA); Rubens Rahim, Markham (CA); Joël Hughes, Hamilton (CA); Wai-See Candy Wong, Richmond Hill (CA); Lucas Skoczkonski, Oakville (CA)

(73) Assignee: Redknee Inc., Mississauga, Ontario ( * ) Notice: Subject to any disclaimer, the term of this patent is extended or adjusted under 35 U.S.C. 154(b) by 1157 days.

(21) Appl. No.: 10/294,651

(22) Filed: Nov. 15, 2002

(65) Prior Publication Data

US 2004/0097245 A1    May 20, 2004

(51) Int. Cl.
*G06F 17/60* (2006.01)
*G09B 3/00* (2006.01)
(52) U.S. Cl. .......................................... 705/14; 434/322
(58) Field of Classification Search ..................... 705/14
See application file for complete search history.

(56) References Cited

U.S. PATENT DOCUMENTS

| | | | | |
|---|---|---|---|---|
| 4,623,920 | A * | 11/1986 | Dufresne et al. | 380/240 |
| 6,286,005 | B1 * | 9/2001 | Cannon | 707/100 |
| 2002/0128908 | A1 * | 9/2002 | Levin et al. | 705/14 |
| 2002/0194062 | A1 * | 12/2002 | Linde | 705/14 |
| 2003/0007625 | A1 * | 1/2003 | Pines et al. | 379/223 |
| 2003/0182191 | A1 * | 9/2003 | Oliver et al. | 705/14 |
| 2004/0110486 | A1 * | 6/2004 | Sobel | 455/405 |
| 2004/0192337 | A1 * | 9/2004 | Hines et al. | 455/456.1 |
| 2007/0036306 | A1 * | 2/2007 | Pines et al. | 379/114.01 |

OTHER PUBLICATIONS

Patricia Odell, Feb. 2001, Journal ISSN: 1046-4174, v13, n2, p. 45+.*

* cited by examiner

*Primary Examiner*—Matthew S Gart
*Assistant Examiner*—Garcia Ade
(74) *Attorney, Agent, or Firm*—Perry + Currier Inc.; Stephen J. Perry; T. Andrew Currier

(57) ABSTRACT

A system and method are disclosed for providing a complete architectural and procedural solution to wireless subscriber loyalty issues. A flexible promotion creation environment allows mobile phone operators to rapidly create and deploy various incentive programs and other such loyalty schemes; together with a data mining and profiling method for tracking, monitoring and analysing subscriber (or aggregate) usage information associated with given promotions. The proposed data mining and profiling method purposely incents specific subscriber behaviors by triggering a point-based reward scheme based on the dynamic screening of event records which are correlated with incented behaviors. Wherein a threshold is assigned based on usage information for a particular promotion; upon realization of which, the subscriber is, immediately notified of the reward through a plurality of means including e-mail, voice notification and by way of Short Message Service (SMS) at their wireless handset.

18 Claims, 3 Drawing Sheets

WIRELESS SUBSCRIBER LOYALTY SYSTEM AND METHOD

BACKGROUND ART

Securing new clientele while sustaining the approval and satisfaction of existing ones is perhaps a feature common to most, if not all business concerns. In seeking these ends most businesses implement various customer loyalty and reward programs, of which, frequent flyer miles would arguably be the most well-known. The telecommunications industry is no different. Mobile subscribers for instance are notorious for indiscriminately switching between mobile phone operators, with little regard as to brand or service loyalty. The latter must therefore learn to effectively manage and moderate such churn.

As loyalty, and related issues, remain crucial to the survival of telecommunications companies and service providers it seems unsurprising then that the prior art should disclose some existing inventions directed to such ends. For instance, U.S. Pat. No. 6,049,599 to McCausland, et al., entitled Churn Amelioration System and Method therefore, and U.S. Pat. No. 6,301,471 to Dahm et al., entitled Online Churn Reduction and Loyalty System, disclose art relevant solely to the prediction of churn. However, the subscriber data mining and profiling methods disclosed herein are for the most part not directed to the prediction of churn and remain materially unique. Indeed, it is an object of our present invention to disclose a complete system and architecture for the reduction of churn through the implementation of various loyalty schemes and promotions coupled with immediate subscriber notification of rewards thereof.

U.S. Pat. No. 6,052,447 to Golden et al., entitled Method and apparatus for aggregating customer information for a telecommunications system, discloses art directed towards applying discounts and/or promotions to calls which meet identified patterns or thresholds. Said patterns and the means used to identity and appraise them remain limited to call time, cost, number of calls, destination and/or geographic region. The art of our invention is not tied to any particular call variables, and indeed the value of the Promotion Creation Environment (PCE) remains in its bespoke and tailor-able nature. Additionally, our invention is directed to wireless subscriber loyalty issues and the benefits providing near real-time notification of rewards and other incented behaviour(s).

U.K. Patent No. 2,367,445 to Mayes et al., entitled Rewarding a Customer for Call Usage, presents a system for rewarding and penalising customers for call usage across a telecommunications network. However the art detailed therein does not intimate any special data mining and profiling method, nor a novel loyalty promotion creation environment, or for that matter, any immediate method for subscriber reward notification.

Similarly, U.S. Pat. No. 5,991,376 to Hennessy, et al., entitled Subscriber Reward Method, discloses a technique for providing an instantaneous reward to a communications subscriber. The method therein nevertheless remains particular to inter-exchange carriers, local service providers, and/or internet service providers.

REFERENCES CITED:

| | | | |
|---|---|---|---|
| U.S. Pat. 6,301,471 | October 2001 | Dahm et al. | 455/405 |
| U.S. Pat. 6,052,447 | April 2000 | Golden et al. | 379/114.1 |
| U.S. Pat. 6,049,599 | April 2000 | McCausland et al. | 379/111 |
| U.S. Pat. 5,991,376 | November 1999 | Hennessy et al. | 379/114.1 |
| Foreign Patent Document(s) 2367445 | April 2002 | GB. | |

TECHNICAL FIELD

The present invention relates generally to wireless communications and services; and more specifically, details a complete framework for the management and implementation of wireless subscriber loyalty programs and rewards.

SUMMARY OF THE INVENTION

Indeed, with the prior art particularly silent on the issue of wireless subscriber loyalty, the invention of present remains avant-garde in terms of its scope and application. Now, with typical loyalty-type promotions there usually requires something in the order of two to six months to develop and test the software and related technical architecture necessary for its implementation. However, it remains an aspect of the present invention to disclose a novel promotion creation environment which compresses the marketing-to-launch cycle well beyond the existing art (one day to a week at most). By means of graphical user interface (GUI), the mobile phone operator is presented with a system for autonomous promotion definition, which utilizes various trigger definitions, conditions and thresholds for the particular behaviour being incented.

Another aspect of the present invention discloses a data mining and profiling method which incents specific subscriber behaviours by triggering a point-based reward scheme based on the dynamic screening of event records which are correlated with incented behaviors. Specifically, the underlying algorithm gathers information via operational measurements and/or event detail records (EDRs) from various sources within the carrier's network and dynamically associates a point based reward if certain triggering criteria are met. The triggering criteria may be based on the number of events (weighted by importance) and chronologically delimited.

Furthermore, traditional subscriber profiling has traditionally been two dimensional in that a set of parameters was stored for each subscriber and used in single manner by one or more applications. A subscriber could have many different profiles but the profiles would be intended to only be used in one way. In addressing these deficiencies of the art, a new user profiling method is proposed in order to proactively define a multidimensional subscriber state which will include aspects such as the subscriber's service profile as a function of time, the subscriber's usage patterns, the user's preferences for the active acquisition of data (e.g. stock info, weather etc.) as a function of time, and the subscriber's preference's for the active dissemination of data (e.g. current location, ability to chat etc.) as a function of time.

For example, in the case of a carrier which wishes to incent the use of prepaid wireless services, the loyalty & rewards algorithm may be set to allocate a 100-point reward on the basis of a $50 net recharge within a 30 day time window. The data mining and profiling engine would acquire and maintain a history of recharge activities for a specified grouping (e.g. all) of its subscribers. In particular, the value and date of each recharge over a suitable chronological window would be retained for each subscriber and utilized to determine if the specified trigger criteria has been met. Note that multiple recharge/usage activities may meet the trigger requirements (e.g. 5×$10 or 1×$50 recharge activities within 30 days). Where the trigger criteria are satisfied, a trigger notification is provided to the loyalty application which correlates the trigger event with a pre-defined point allocation.

In alternate embodiments, multiple trigger criteria could be established over a given event (chronological) window in that the same underlying event records may lead to several trigger criteria being met. In still further embodiments, the loyalty application may be implemented with a multiplicity of means for dealing with concurrent trigger events. The data mining and profiling method may for instance, (i) aggregate the points associated with each trigger over a given event window; (ii) allocate the points in a sequential (chronological) manner (a given trigger event would reset the applicable chronological window for subsequent trigger events to a point which begins after the event which initiated the earlier trigger); or iii) select the trigger event with the minimum or maximum point value at the carrier's discretion.

Given then the present embodiment, upon creation of a promotion, one or more monitors would be applied to a subscriber's account, one or more triggers would be set for certain promotion criteria (date, balance of account) and one or more actions would be associated with each trigger. Where specified criteria are met, the monitors would be triggered and the corresponding actions would take place. An action can, non-exhaustively, range from an increment in a subscriber's account, modification of a subscriber's prepaid service rate plan or a Short Message Service (SMS) notification to the subscriber.

According to yet another aspect of the present invention, subscribers are immediately notified of their promotional reward through a plurality of systems, including e-mail, voice notification and by way of Short Message Service (SMS) at their wireless handset. Considering that existing promotional applications generate reports on a nightly, weekly or even monthly basis; it must be questioned whether the resulting output is meaningful in the least considering the time delay between the subscriber activity and the actual delivery of the reward notification to the subscriber.

Indeed, it may take up to a month to deliver the reward based on a recharge that happened 30 days ago. That is, the efficacy of existing loyalty applications are diminished as the subscriber does not correlate the receipt of the reward with the underlying incented behavior.

These features and other such advantages of the present invention shall become readily apparent from the following description and accompanying drawings.

DETAILED DESCRIPTION OF THE PREFERRED EMBODIMENTS

Figure 1:
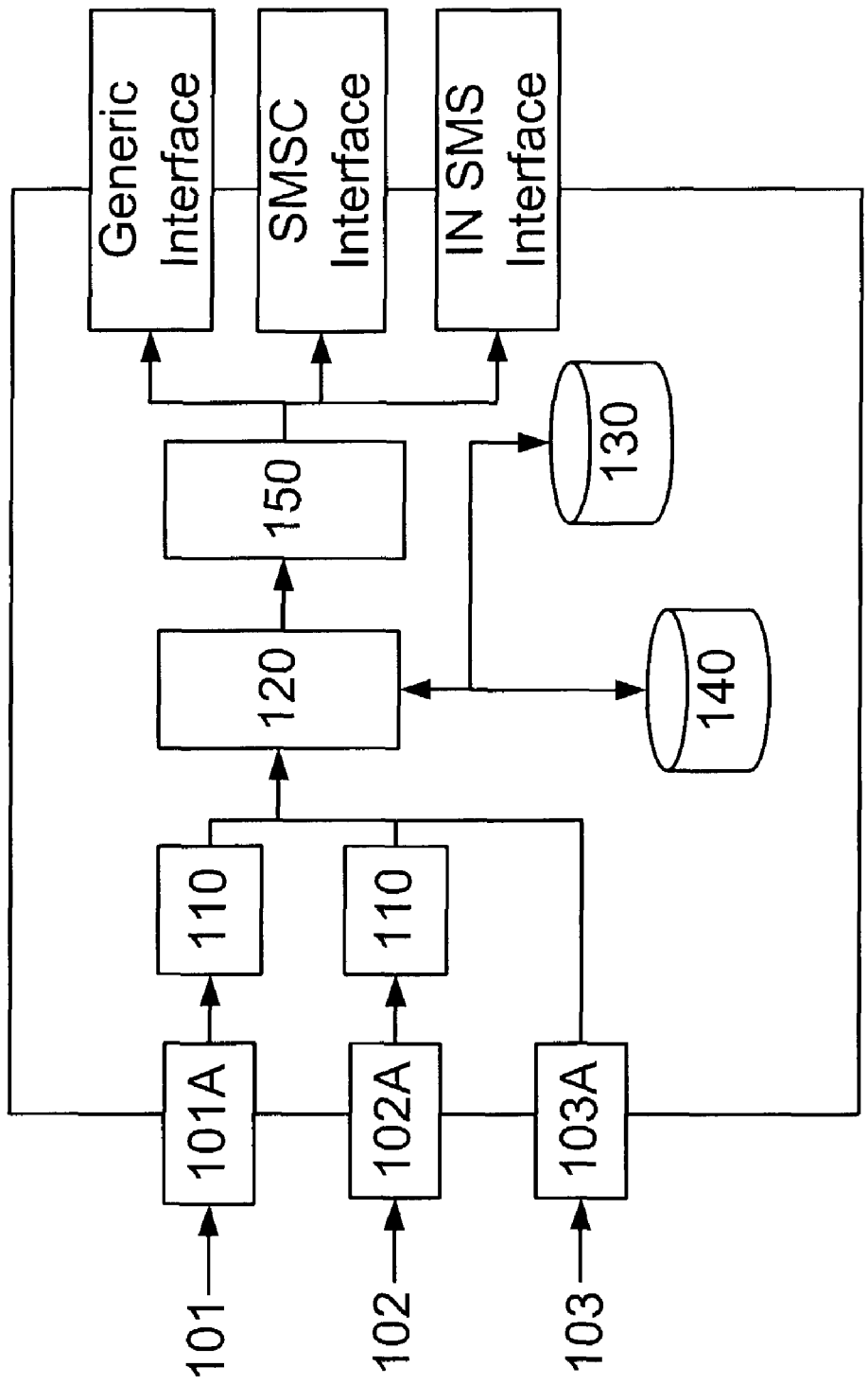
FIG. 1 illustrates a typical, non-limiting embodiment of the system level architecture employed in the disclosure of present.

With reference to FIG. 1, subscriber and operator-initiated transactions generate transaction records and/or real-time notifications of the event in question; be they EDR streams 101, ASP reports 102 and/or Provisioning requests 103.

At the corresponding interface, SCP OAM interface 101A, New Subscriber Provisioning interface (ASP) 102A, or Promotion Provisioning interface 103A, the Wireless Subscriber Loyalty System poller and translator 110 interfaces poll records from transaction record source locations and transforms said data into the Wireless Subscriber Loyalty System-standard data encoding format.

The Wireless Subscriber Loyalty System-standard encoded data is then processed by the Promotion Engine (PE) 120 in an attempt to identify if any said promotions are in fact associated with the subscriber in question 140 (usually based upon, in the preferred embodiment, said subscriber's Identifier(s) which may include the subscriber's Mobile Station Integrated Services Digital Network Number (MSISDN) or Mobile Directory Number (MDN) or Network Address Identifier (NAI), to retrieve the promotion details 130. Those skilled in the art shall recognize that a variety of addressing schemes may be utilized as a form of subscription identification without diluting the intent and scope of the present invention.

Figure 2:
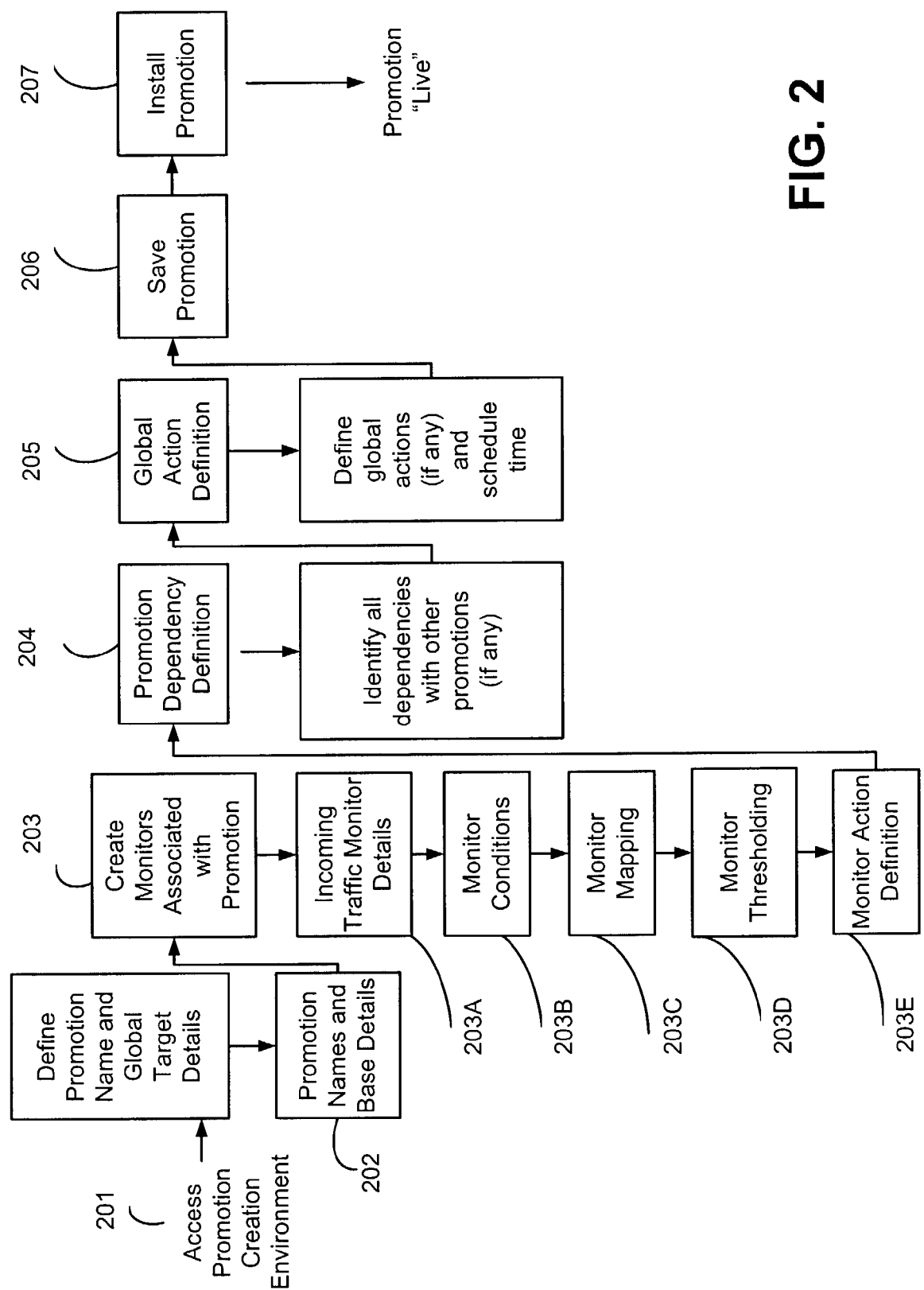
FIG. 2 represents an illustrative block diagram of the Promotion Creation Environment (PCE) detailing the flexible graphical user interface (GUI) for the rapid creation of promotions.

For transactions which are associated with a promotion and satisfy all promotion conditions (e.g. called address not equal to *611), the subscriber profile 140 is updated based on the promotion profile 130 as defined in the Promotion Creation Environment (detailed further in FIG. 2).

In the event that a subscriber profile 140 update causes a promotion monitor threshold to be breached (detailed further in FIG. 3), the actions associated with the monitor are queued in the action queue handler with the corresponding action execution date (e.g. immediate, absolute date, relative date) 150. Upon action execution date, the action queue 150 forwards the action data to the appropriate action handler.

FIG. 2 now, for the sake of simplicity, details in a word diagram the process flows concerned in the creation of promotions by means of a graphical user interface (GUI). At 201 the administrator in question logs into the representative Promotion Creation Environment (PCE) and defines the promotion name and relevant base details 202 (e.g. private versus promotion designation).

The procedural flow at 203 concerns the definition of various promotion monitors. Said monitors may include, incoming traffic characteristics 203A (e.g. event record type), conditions that must be satisfied for this monitor 203B (e.g. called address=*611), actions to perform upon condition satisfaction 203C (e.g. increment minutes used counter), threshold values set for actions to be triggered 203D (e.g. minutes used equal 1000), and/or actions performed (and execution time) upon threshold triggering 203E (e.g. send SMS). The monitors, 203A, 203B, 203C, 203D and 203E remain representative and non-limiting in their scope.

At 204, the promotional dependencies (if any) are defined to indicate any promotions co-existence restrictions. At 205, global actions (if any) are defined and their requisite scheduled execution time (s). The promotion is then saved 206, stored in the promotion database (130 in FIG. 1); and subsequently installed 207. Said promotion is now "live."

Figure 3:
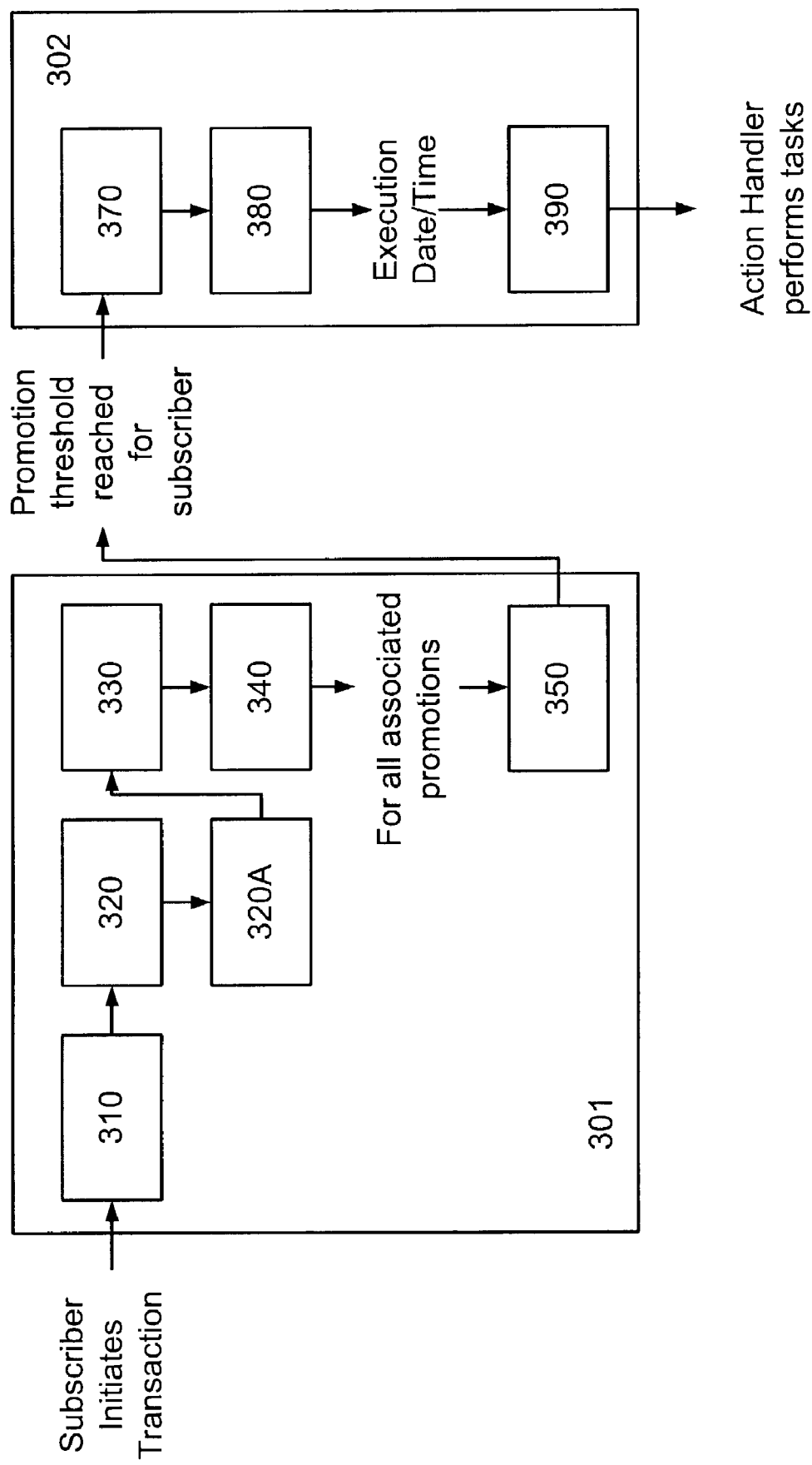
FIG. 3 is an illustrative block diagram detailing the improved data mining and profiling methods for loyalty and related reward schemes, in tandem with the threshold realization facets and event/promotion notification aspects of the present art.

Now in reference to FIG. 3 which details the subscriber profiling 310 and reward mechanisms 302 for the disclosed Wireless Subscriber Loyalty System and Method. Indeed, whenever said subscriber initiates a transaction an event record/trigger is generated 310 which is subsequently polled by the wireless subscriber loyalty system interface 320 and transformed into the Wireless Subscriber Loyalty System-standard data encoding format 320A.

The Wireless Subscriber Loyalty promotion engine then processes the data of 320A at 330; the subscriber profile is queried to retrieve all applicable promotions 340. The said subscriber profile is then updated based on the promotion mapping fields (detailed in FIG. 2) 350.

Upon promotion threshold realization, the reward mechanism of the present art is invoked 302. Upon invoking a promotion action 370, said action(s) are inserted into the action queue with the execution time (in the preferred embodiment) 380. The action(s) are popped from the former action queue and sent to the action handler 390, for delivery/routing as appropriate.

What is claimed is:

1. A computer-based system for creating and implementing a subscriber promotional reward scheme comprising:
   a computer-based interface configured to receive records from a plurality of transaction record source locations; said records containing data representing events relative to a subscriber; said computer-based interface additionally configured for transforming said data into standardized data; said standardized data being in a standard data encoding format;
   a computer-based promotion engine connected to said computer-based interface for receiving said standardized data;
   a computer-based subscriber profile database connected to said computer-based promotion engine for maintaining a subscriber profile relative to said subscriber; said computer-based subscriber profile database configured to receive and respond to requests from said computer-based promotion engine for subscriber profile data stored in said subscriber profile based on said subscriber identifier;
   a computer-based promotion profile database connected to said computer-based promotion engine for maintaining carrier configurable promotion monitors; said computer-based promotion profile database configured to receive and respond to requests from said computer-based promotion engine for promotion monitors corresponding to said events and based on said subscriber identifier and said events; and,
   said computer-based promotion engine configured to update said subscriber profile data based on said promotion monitors and said subscriber profile data; said computer-based promotion engine further configured to store an update to said subscriber profile data on said computer-based subscriber profile database.

2. The system of claim 1 further comprising an action queue handler connected to said promotion engine; said promotion engine further configured to determine if a promotion monitor threshold has been reached for said subscriber and to forward instructions to said action queue handler for a reward mechanism in fulfillment of said promotion.

3. The system of claim 1 wherein said promotion is a subscriber loyalty program.

4. The system of claim 1 wherein said input device is for receiving event detail record (EDR) streams.

5. The system of claim 4 wherein said interface is a Service Control Point ("SCP") Operations Administration Maintenance ("DAM") interface.

6. The system of claim 1 wherein said input device is for receiving a provisioning request.

7. The system of claim 6 wherein said interface is a promotion provisioning interface.

8. The system of claim 1 wherein said promotion monitors are based on one or more of: time usage by said subscriber; usage patterns of said subscriber; user preferences for acquisition of active data as a function of time; and the subscriber's preference for the active dissemination of data a function of time.

9. The system of claim 8 wherein said active data is based on stock information or weather information.

10. The system of claim 8 wherein said subscriber's preferences for the active dissemination of data is based on current location of said subscriber and an ability of said subscriber to utilize chat services.

11. The system of claim 1 wherein said promotion monitors include one or more of:
   incoming traffic characteristics; excluded telephone numbers;
   actions to perform upon condition satisfaction; threshold values set for actions to be triggered; actions to be performed on reaching of threshold values.

12. The system of claim 11 wherein said incoming traffic characteristics is derived from an event record type.

13. The system of claim 11 wherein said excluded telephone numbers include *611.

14. The system of claim 13 wherein said threshold values set for actions is an aggregate value of time or an aggregate number of transactions.

15. The system of claim 2 wherein said action includes sending a short message service SMS message.

16. The system of claim 1 further comprising a graphical user interface connected to said promotion engine for creating, modifying, deleting, and/or updating said promotion monitors.

17. The system of claim 1 wherein said promotion profile database is further configured to maintain a set of promotion dependency definitions respective to each promotion monitor; said
   promotion dependency definitions including promotion monitor dependencies on at least one other promotional reward scheme.

18. The system of claim 1 wherein said promotion profile database is further configured to maintain a set of global action definitions respective to each promotion monitor.

* * * * *